United States Patent
Abe et al.

(10) Patent No.: US 10,725,665 B2
(45) Date of Patent: Jul. 28, 2020

(54) STORAGE CONTROLLING APPARATUS, RECORDING MEDIUM FOR RECORDING STORAGE CONTROL PROGRAM AND STORAGE CONTROLLING METHOD

(71) Applicant: FUJITSU LIMITED, Kawasaki-shi, Kanagawa (JP)

(72) Inventors: Marie Abe, Kawasaki (JP); Koutarou Nimura, Kawasaki (JP); Hiroshi Imamura, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/961,938

(22) Filed: Apr. 25, 2018

(65) Prior Publication Data

US 2018/0314440 A1 Nov. 1, 2018

(30) Foreign Application Priority Data

Apr. 28, 2017 (JP) ................... 2017-089936

(51) Int. Cl.
*G06F 3/06* (2006.01)
*G06F 11/10* (2006.01)
(Continued)

(52) U.S. Cl.
CPC .......... *G06F 3/0616* (2013.01); *G06F 3/0644* (2013.01); *G06F 3/0653* (2013.01);
(Continued)

(58) Field of Classification Search
CPC .... G06F 3/0616; G06F 3/0653; G06F 3/0689; G06F 11/0727; G06F 11/3034; G06F 11/3476
See application file for complete search history.

(56) References Cited

U.S. PATENT DOCUMENTS 9,256,381 B1 * 2/2016 Fultz .................. G06F 16/185
2006/0069866 A1 3/2006 Miyazaki
(Continued)

FOREIGN PATENT DOCUMENTS

| JP | 2005-182658 | 7/2005 |
|---|---|---|
| JP | 2006-092070 | 4/2006 |
| JP | 2006-318246 | 11/2006 |

OTHER PUBLICATIONS

Wan et al "RSA: RAID system with Self-healing and Active data migration" [online] Published to IEEE Xplore Dec. 6, 2010 [retrieved on Apr. 8, 2019]. Retrieved from the Internet <URL: https://ieeexplore.ieee.org/document/5658421> (Year: 2010).*

*Primary Examiner* — David Yi
*Assistant Examiner* — Dustin B. Fulford
(74) *Attorney, Agent, or Firm* — Fujitsu Patent Center

(57) ABSTRACT

A storage controlling apparatus, includes: a memory configured to store a program; and a processor configured to control a plurality of storage devices based on the program, wherein the processor: collects information relating to a data access performed for the plurality of storage devices; and decides performance degradation of a first storage device from among the plurality of storage devices based on a response achievement time period for a first data access request performed for the first storage device, and a response time period average value and a response time period standard deviation which are calculated based on response achievement time periods with respect to a plurality of data access requests performed for the first storage device before the first data access request.

3 Claims, 13 Drawing Sheets

(51) Int. Cl.
*G06F 11/34* (2006.01)
*G06F 11/07* (2006.01)
*G06F 11/30* (2006.01)

(52) U.S. Cl.
CPC ........ *G06F 3/0689* (2013.01); *G06F 11/0727* (2013.01); *G06F 11/1076* (2013.01); *G06F 11/3034* (2013.01); *G06F 11/3476* (2013.01)

(56) References Cited

U.S. PATENT DOCUMENTS

| | | | |
|---|---|---|---|
| 2006/0259686 A1 | 11/2006 | Sonobe | |
| 2012/0317358 A1* | 12/2012 | Ando | G06F 3/0605 711/117 |
| 2016/0062658 A1* | 3/2016 | Urata | G06F 3/0604 711/114 |

* cited by examiner

FIG. 3

|  | DATA AMOUNT (EQUAL TO OR GREATER THAN 1 Mbyte) | DATA AMOUNT (65Kbyte TO 1Mbyte) | DATA AMOUNT (LESS THAN 65Kbyte) |
|---|---|---|---|
| WRITE |  |  |  |
| READ |  |  |  |

| | DATA AMOUNT (EQUAL TO OR GREATER THAN 1 Mbyte) | DATA AMOUNT (65Kbyte TO 1Mbyte) | DATA AMOUNT (LESS THAN 65Kbyte) |
|---|---|---|---|
| WRITE | Awl | Awm | Aws |
| READ | Arl | Arm | Ars |

163

| | DATA AMOUNT (EQUAL TO OR GREATER THAN 1 Mbyte) | DATA AMOUNT (65Kbyte TO 1Mbyte) | DATA AMOUNT (LESS THAN 65Kbyte) |
|---|---|---|---|
| WRITE | 16ms (Awl) | 11ms (Awm) | 6ms (Aws) |
| READ | 14ms (Arl) | 9ms (Arm) | 5ms (Ars) |

163

| | DATA AMOUNT (EQUAL TO OR GREATER THAN 1 Mbyte) | DATA AMOUNT (65Kbyte TO 1Mbyte) | DATA AMOUNT (LESS THAN 65Kbyte) |
|---|---|---|---|
| WRITE | Swl | Swm | Sws |
| READ | Srl | Srm | Srs |

164

|  | DATA AMOUNT (EQUAL TO OR GREATER THAN 1 Mbyte) | DATA AMOUNT (65Kbyte TO 1Mbyte) | DATA AMOUNT (LESS THAN 65Kbyte) |
|---|---|---|---|
| WRITE | 1.0(Swl) | 1.54(Swm) | 1.59(Sws) |
| READ | 1.86(Srl) | 1.42(Srm) | 1.60(Srs) |

164

|  | DATA AMOUNT (EQUAL TO OR GREATER THAN 1 Mbyte) | DATA AMOUNT (65Kbyte TO 1Mbyte) | DATA AMOUNT (LESS THAN 65Kbyte) |
|---|---|---|---|
| WRITE | 1.14(Swl) | 1.64(Swm) | 1.50(Sws) |
| READ | 1.79(Srl) | 1.70(Srm) | 1.65(Srs) |

164

STORAGE CONTROLLING APPARATUS, RECORDING MEDIUM FOR RECORDING STORAGE CONTROL PROGRAM AND STORAGE CONTROLLING METHOD

CROSS-REFERENCE TO RELATED APPLICATION

This application is based upon and claims the benefit of priority of the prior Japanese Patent Application No. 2017-89936, filed on Apr. 28, 2017, the entire contents of which are incorporated herein by reference.

FIELD

The embodiments discussed herein are related to a storage controlling apparatus, a recording medium that records a storage control program and a storage controlling method.

BACKGROUND

In a storage system, a failure of a disk apparatus (hereinafter referred to simply as disk) is detected by performing statistic point addition.

The related art is disclosed in Japanese Laid-open Patent Publication No. 2006-92070, Japanese Laid-open Patent Publication No. 2005-182658 or Japanese Laid-open Patent Publication No. 2006-318246.

SUMMARY

According to an aspect of the embodiments, a storage controlling apparatus, includes: a memory configured to store a program; and a processor configured to control a plurality of storage devices based on the program, wherein the processor: collects information relating to a data access performed for the plurality of storage devices; and decides performance degradation of a first storage device from among the plurality of storage devices based on a response achievement time period for a first data access request performed for the first storage device, and a response time period average value and a response time period standard deviation which are calculated based on response achievement time periods with respect to a plurality of data access requests performed for the first storage device before the first data access request.

The object and advantages of the invention will be realized and attained by mean of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 depicts an example of a classification method of input/output (I/O) information by a data classification unit of a storage controlling apparatus;

DESCRIPTION OF EMBODIMENTS

Figure 1:
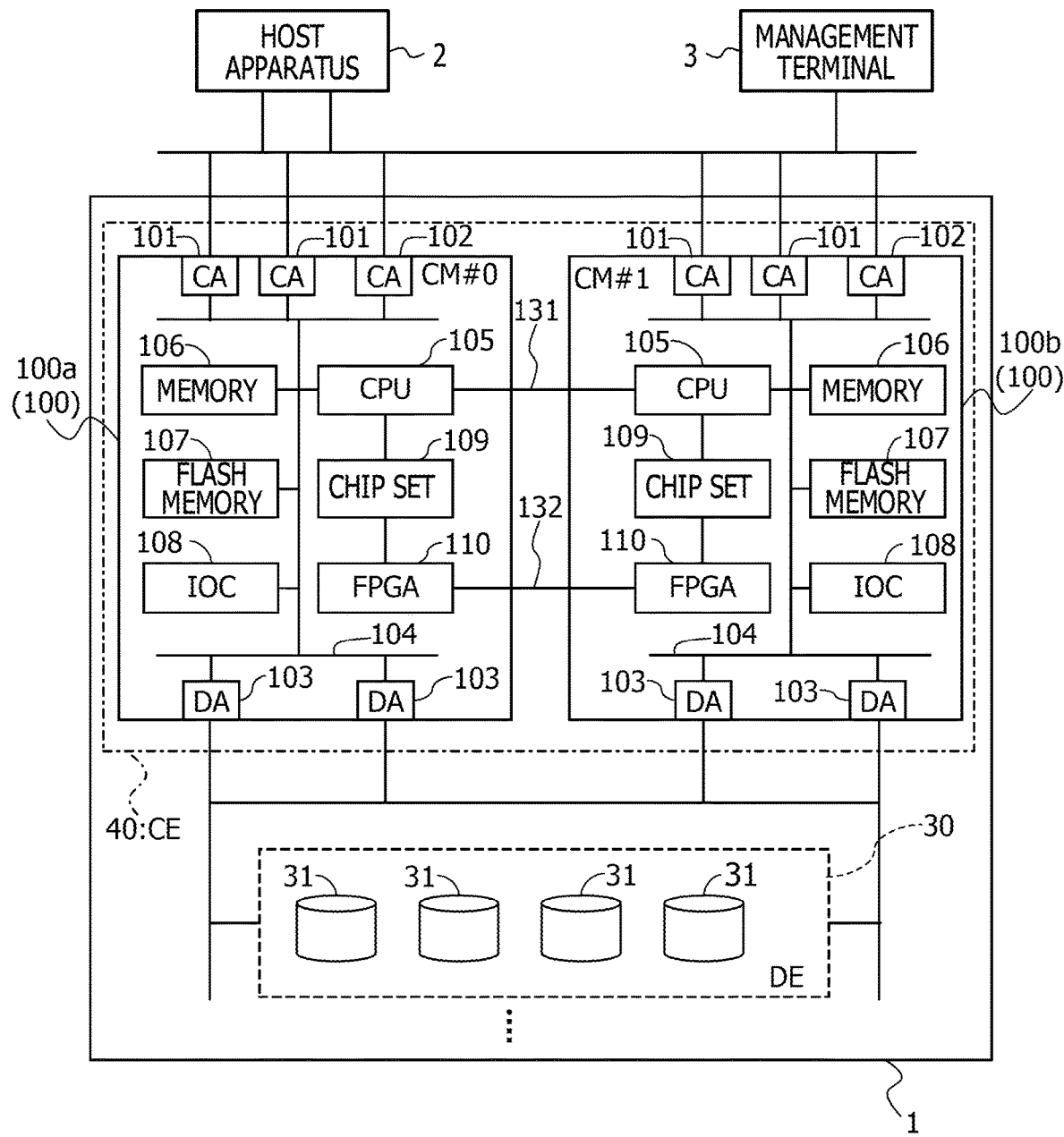
FIG. 1 depicts an example of a hardware configuration of a storage apparatus including a storage controlling apparatus.

For example, point addition is performed when a disk error or a path error is detected, and members are detached preferentially beginning with a member with regard to which an addition point value exceeds a fixed value (for example, 255 points).

The addition point value or a point addition target differs depending upon the error. In the case of a disk error, point addition is performed only to a disk, but in the case of a path error, point addition is performed to all members of the path to which a command is issued.

A storage apparatus is operated using a plurality of disks. For example, when a path error occurs, point addition is performed for each of individual I/O accesses to the plurality of disks. Therefore, since the point addition to path members that form a common path is relatively larger than that to the disks, the addition point value to the path members may reach an upper limit earlier and the path members may be detached.

For example, in a storage apparatus in which such failure detection by statistic point addition as described above is performed and a countermeasure is taken, a disk that is placed in a slowdown state may not be detached.

A disk in the slowdown state signifies a disk that is in a state in which, although degradation of a response occurs, this is not detected as timeout because the response value does not reach a threshold value (for example, five seconds) for a driver timeout and a hard error is not detected either. Slowdown occurs when an I/O response delay occurs by retry repetitive operations of the disk itself arising from quality degradation or the like.

Accordingly, the disk in the slowdown state is a disk in which the performance is degraded and in a suspected state in which, although a failure is not decided, an omen of a failure is indicated.

In a redundant array of inexpensive disks (RAID), if part of member disks in a RAID group is placed into the slowdown state, degradation of the I/O performance as the RAID group occurs.

For example, in a storage system, when a response delay in a disk access process occurs, backend delay information is collected as an analysis log. For example, a threshold value for the response delay when delay information is collected is equal to that for the driver timeout (for example, five seconds). Accordingly, since a log is not collected if a response delay having a degree similar to that of the driver timeout does not occur, the disk in the slowdown state does not remain in an analysis log and the manager or the like may not grasp occurrence of a delay.

Since the disk in the slowdown state continuously remains in a storage system without being detached, the possibility that a response delay may occur again is high and the disk may give rise to a two-point failure.

In some host apparatus, the I/O timeout is set to a very short period of time (for example, eight seconds), and, if a plurality of delay logs occur in such apparatus as just described, a host I/O may be influenced by this.

In order to suppress degradation of the I/O performance of a RAID group caused by slowdown of part of member disks of the RAID group, the threshold value for the driver timeout may be decreased.

For example, if the threshold value for the driver timeout is decreased, also a "response delay of a disk arising from an overload occurring upon I/O of a high load" that is not intended as a slowdown phenomenon is detected as a driver timeout, and such problems as described below may occur.

(1) A statistical process excessively operates upon I/O operation of a high load and a disk is detached.

(2) That a great number of delay logs are collected gives rise to increase of the labor for a log analysis by increase of unwanted logs, oppression of the total log amount of analysis logs and increase of the writing amount into a boot-up and utility device (BUD) of a log writing destination.

For example, the present technology makes it possible to detect a storage device placed in a performance degradation state.

FIG. 1 depicts an example of a hardware configuration of a storage apparatus including a storage controlling apparatus.

The present storage apparatus 1 virtualizes a storage device (hereinafter also referred to as disk) 31 stored in a drive enclosure (DE) 30 to form a virtual storage environment. Further, the storage apparatus 1 provides a virtual volume to a host apparatus (server) 2 that is an upper apparatus.

The present storage apparatus 1 is coupled communicably to one or more (in an example of FIG. 1, one) host apparatus 2. The host apparatus 2 and the storage apparatus 1 are coupled to each other through communication adapters (CAs) 101 and 102 hereinafter described.

The host apparatus 2 is an information processing apparatus including, for example, a server function and performs transmission and reception of a command of a network attached storage (NAS) or a storage area network (SAN) to and from the present storage apparatus 1. The host apparatus 2 transmits a storage access command such as a read/write command in the NAS, for example, to the storage apparatus 1 to perform writing or reading out of data into or from a volume provided by the storage apparatus 1.

The present storage apparatus 1 performs, in response to an inputting or outputting request (for example, a writing request or a reading out request) performed for the volume by the host apparatus 2, a process such as reading out (read) or writing (write) of data from or into the storage device 31 corresponding to the volume. In the following description, the inputting or outputting request from the host apparatus 2 is referred to sometimes as I/O request.

A management terminal 3 is coupled communicably to the storage apparatus 1. The management terminal 3 is an information processing apparatus including an inputting apparatus such as a keyboard or a mouse and a displaying apparatus, and the user such as a system manager performs an inputting operation of various kinds of information to the management terminal 3. For example, the user input information relating various settings and so forth through the management terminal 3. The inputted information is transmitted to the host apparatus 2 or the storage apparatus 1.

As depicted in FIG. 1, the present storage apparatus 1 includes a plurality of (in the present embodiment, two) controller modules (CMs) 100a and 100b and one or more (in the example depicted in FIG. 1, one) DEs 30.

The DE 30 may incorporate one or more (in the example depicted in FIG. 1, four) storage devices (physical disks) 31 therein and provides a storage region (actual volume, actual storage) of these storage devices 31 to the present storage apparatus 1.

For example, the DE 30 includes multi-stage slots (not depicted) and may change an actual volume capacity at any time by mounting a storage device 31 into a slot. Further, a RAID is configured using a plurality of storage devices 31. Since the configuration and the management of the RAID may be implemented by a known technique, description of them is omitted.

The storage device 31 is a storage device (storage) such as a hard disk drive (HDD) or a solid state drive (SSD) having a greater capacity than that of a memory 106 hereinafter described, and stores various kinds of data therein. It is to be noted that, in the following description, the storage device is referred to sometimes as drive or disk.

Each of the DEs 30 is individually coupled to device adapters (DAs) 103 of the CM 100a and DAs 103 of the CM 100b. Further, the CMs 100a and 100b may access to each DE 30 to perform writing and reading out of data. For example, by coupling each of the CMs 100a and 100b to each of the storage devices 31 of the DE 30, an access path to the storage devices 31 is made redundant.

A controller enclosure (CE) 40 includes one or more (in the example depicted in FIG. 1, two) CMs 100a and 100b.

The CMs 100a and 100b are controlling apparatus (controllers, storage controlling apparatus) that control operation in the storage apparatus 1, and perform various kinds of control such as data access control to the storage device 31 of the DE 30 in accordance with the I/O request transmitted from the host apparatus 2. Further, the CMs 100a and 100b include configurations similar to each other. In the following description, as reference symbols indicating the CMs, reference symbols 100a and 100b are used when one of the plurality of CMs is to be specified and reference symbol 100 is used when an arbitrary CM is to be designated. Further, the CM 100a and the CM 100b are sometimes represented by CM #0 and CM #1, respectively.

The CMs 100a and 100b are made redundant and the CM 100a (CM #0) may perform various kinds of control as the primary. However, upon failure of the primary CM 100a, the secondary CM 100b (CM #1) succeeds operation of the CM 100a as the primary.

The CMs 100a and 100b are each coupled to the host apparatus 2 through the CAs 101 and 102. In addition, the CMs 100a and 100b receive the I/O request such as a read/write request transmitted from the host apparatus 2 and perform control of the storage devices 31 through the DA 103 and so forth. Further, the CMs 100a and 100b are coupled communicably with each other through an interface such as a peripheral component interconnect express (PCIe) interface.

As depicted in FIG. 1, each of the CMs 100 includes the CAs 101 and 102 and a plurality of (in the example depicted in FIG. 1, two) DAs 103 and further includes a central processing unit (CPU) 105, the memory 106, a flash memory 107 and an input output controller (IOC) 108. The CAs 101 and 102, DAs 103, CPU 105, memory 106, flash memory 107 and IOC 108 are coupled communicably to each other, for example, through a PCIe interface 104.

To the CPU 105 of the CM 100, a flexible programmable gate array (FPGA) 110 for monitoring control is coupled through a chip set 109.

Each of the CAs 101 and 102 is an adapter that receives data transmitted from the host apparatus 2, management terminal 3 or the like and transmits data outputted from the CM 100 to the host apparatus 2, management terminal 3 or the like. For example, each of the CAs 101 and 102 controls inputting and outputting of data to and from an external apparatus such as the host apparatus 2.

Each CA 101 is a network adapter that is coupled communicably to the host apparatus 2 and the management terminal 3 through a NAS and is, for example, a local area network (LAN) interface or the like. Each CM 100 is coupled to the host apparatus 2 and so forth through a communication line not depicted by the CAs 101 through a NAS, and performs reception of the I/O request, transmission, and reception of data and so forth. In FIG. 1, each of the CMs 100a and 100b includes two CAs 101.

The CA 102 is a network adapter that is coupled communicably to the host apparatus 2 through a SAN and is, for example, an internet small computer system interface (iSCSI) interface or a fibre channel (FC) interface. Each CM 100 is coupled to the host apparatus 2 or the like through a communication line not depicted by the CA 102 through a SAN and performs reception of an I/O request, transmission and reception of data and so forth. In the example depicted in FIG. 1, one CA 102 is provided in each of the CMs 100a and 100b.

Each DA 103 is an interface for coupling communicably with a DE 30, a storage device 31 and so forth. To each DA 103, the storage devices 31 of the DE 30 are coupled, and each CM 100 performs access control to the storage devices 31 in accordance with an I/O request received from the host apparatus 2.

Each CM 100 performs writing or reading out of data into or from a storage device 31 through a DA 103, and in the example depicted in FIG. 1, two DAs 103 are provided in each of the CMs 100a and 100b. Further, the DE 30 is coupled to each of the DAs 103 in each of the CMs 100a and 100b.

Consequently, for the storage devices 31 of the DE 30, writing and reading out of data may be performed into or from each of the CMs 100a and 100b.

The flash memory 107 is a storage device that stores programs to be executed by the CPU 105, various data and so forth.

Figure 2:
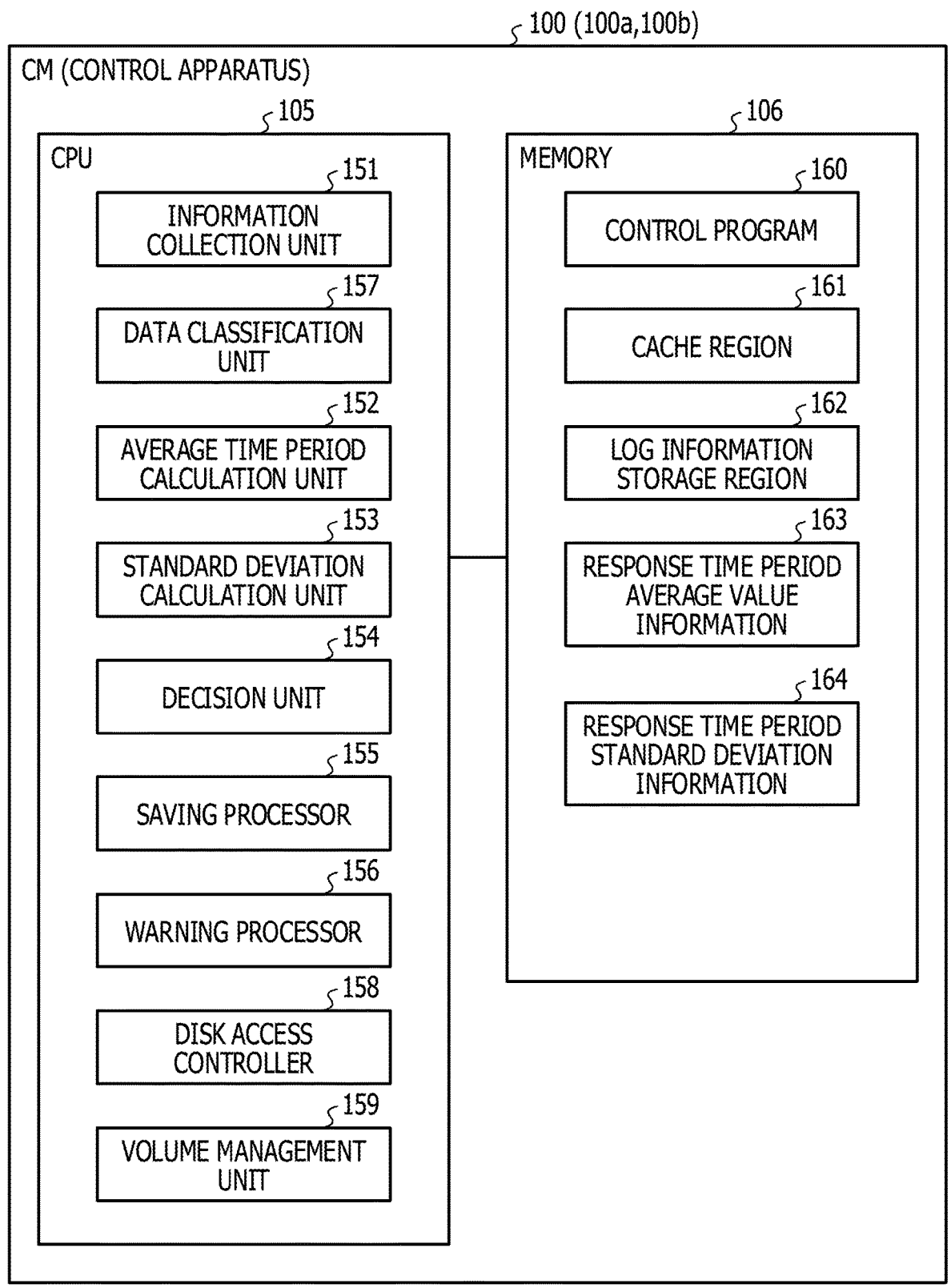
FIG. 2 depicts an example of a functional configuration of a storage controlling apparatus.

The memory 106 is a storage device that temporarily stores various data and programs and stores a control program 160, and includes a cache region 161 and a log information storage region 162 (refer to FIG. 2). The control program 160 is a program that is executed by the CPU 105, for example, in order to implement the storage controlling function (failure omen detection function) of the present embodiment and is stored in the memory 106 or the flash memory 107. The cache region 161 temporarily stores data received from the host apparatus 2 or data to be transmitted to the host apparatus 2. The log information storage region 162 temporarily stores various kinds of log information generated in the storage apparatus 1 including the CMs 100. It is to be noted that the memory 106 may be a random access memory (RAM) or the like having a small capacity although the access speed is high in comparison with the storage device (drive) 31 described hereinabove.

The IOC 108 is a controlling apparatus for controlling data transfer in each CM 100 and implements, for example, direct memory access (DMA) transfer of transferring data stored in the memory 106 without intervention of the CPU 105.

The CPU 105 is a processing apparatus (first processor) that performs various kinds of control and various arithmetic operations and is, for example, a multicore processor (multicore CPU). The CPU 105 executes the operating system (OS) or a program stored in the memory 106, flash memory 107 or the like to implement various functions. The CPU 105 achieves a failure omen detection function for detecting slowdown of the storage device 31 by executing the control program 160.

For example, the CPU 105 executes the control program 160 to implement a function for detecting a storage device (disk; suspected disk) 31 that has been placed into a slowdown (performance degradation) state that is a failure omen.

Between the two CMs 100a and 100b made redundant, two communication paths 131 and 132 are provided.

The first communication path 131 is an inter-CPU communication path that couples the CPU 105 of the CM 100a and the CPU 105 of the CM 100b to each other. The second communication path 132 is an inter-FPGA communication path that couples the FPGA 110 of the CM 100a and the FPGA 110 of the CM 100b to each other.

The chip set 109 manages delivery of data between the CPU 105 and the FPGA 110. The FPGA 110 is a processing apparatus that performs monitoring control of the storage apparatus 1.

The control program 160 is provided in a form in which the control program 160 is recorded on a non-transitory computer-readable recording medium. As the recording medium, a magnetic disk, an optical disk, a magneto-optical disk and so forth are available. As the optical disk, a compact disk (CD), a digital versatile disk (DVD), a Blue-ray disk and so forth are available. The CD includes a CD-read only memory (ROM), a CD-recordable (R)/rewritable (RW) and so forth. The DVD includes a DVD-RAM, a DVD-ROM, a DVD-R, a DVD+R, a DVD-RW, a DVD+RW, a high definition (HD) DVD and so forth.

At this time, the CPU 105 may read out the control program 160 from the recording medium and store the control program 160 into an internal storage device (for example, the memory 106 or the flash memory 107) or an externally provided storage device to use the control program 160. Further, the CPU 105 may receive the control program 160 through a network and store the control program 160 into the internal storage device or the externally provided storage device to use the control program 160.

FIG. 2 depicts an example of a functional configuration of a storage controlling apparatus. As depicted in FIG. 2, the CPU 105 implements functions as an information collection unit 151, a data classification unit 157, an average time period calculation unit 152, a standard deviation calculation unit 153, a decision unit 154, a saving processor 155, a warning processor 156, a disk access controller 158 and a volume management unit 159.

The volume management unit 159 performs management of a volume to be presented as a storage region to a higher-level apparatus such as the host apparatus 2.

The volume management unit 159 combines a plurality of storage regions included in one or more storage devices 31 to configure a virtual volume (virtual volume, logical volume). For example, the volume management unit 159 performs management of a volume using address conversion information that associates an address (logical address) of a storage region of a virtual volume and an address (physical address) of a storage region of the storage device 31. It is to be noted that the function as the volume management unit 159 may be a known function.

The disk access controller 158 performs, in accordance with an I/O request (for example, a writing request or a reading out request) performed for a volume by the host apparatus 2, a disk access process such as reading out (read) or writing (write) of data from or into a storage region of the storage device 31 corresponding to the volume. The disk access controller 158 refers to the address conversion information managed by the volume management unit 159 to grasp a storage region of the storage device 31 corresponding to the volume of the target of the I/O request and issues a disk access command to the storage region. The function as the disk access controller 158 may be a known function.

The information collection unit 151 collects information (performance information, I/O information) regarding a disk access performed for the disk 31 by the disk access controller 158. For example, the information collection unit 151 collects a command type, a data amount and a response time period in regard to a disk access based on the I/O request.

The command type indicates a type of a data access command and represents, for example, which one of read (read command) and write (write access) the type is.

The data amount is a data size for a disk access command and is a data size of data to be read or a data size of data to be written.

The response time period is a period of time taken after the disk access controller 158 issues a disk access request to a storage device 31 until the disk access controller 158 receives a response to the access request from the storage device 31.

The information collection unit 151 aggregates the response time period, for example, in a unit of a given period of time (for example, one second) and retains a result of the aggregation, for example, for a given period of time (for example, 15 minutes) in the log information storage region 162 of the memory 106.

The information collection unit 151 collects a response time period (disk response time period) for each I/O for each of the disks 31. The disk response time period is a period of time taken after a disk access request based on an I/O request is issued to the disk 31 until a response to the disk access request is received. The information collection unit 151 collects the disk response time period by performing timer monitoring. It is to be noted that the disk access request includes a read request and a write request.

For example, if a disk 31 is incorporated newly into a DE 30 or the like, the information collection unit 151 collects the above-described I/O information regarding the newly incorporated disk 31 for a given period of time (for example, 15 minutes) after the disk access command is issued for the first time to the disk 31.

The information collection unit 151 performs accumulation of I/O information in regard to each of the disk access commands for read and write.

The data classification unit 157 classifies the I/O information collected by the information collection unit 151 into a plurality of data ranges (sections) in accordance with a command type and a data amount.

FIG. 3 is a view depicting an example of a classification method of I/O information by a data classification unit of a storage controlling apparatus.

Referring to FIG. 3, the data classification unit 157 classifies I/O information into read commands and write commands and further classifies each data amount of disk access requests into data ranges of three types that are (i) a range equal to or greater than 1 Mbyte, (ii) another range of 65 Kbytes to 1 Mbyte and (iii) a further range less than 65 Kbytes thereby to classify the I/O information into six data ranges (sections).

The data classification unit 157 performs, for I/O information collected by the information collection unit 151, first classification that performs classification by a command type (read/write) and second classification that performs classification in response to a data amount.

Figure 5:
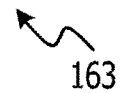
FIG. 5 depicts an example of response time period average value information in a storage controlling apparatus.
Figure 8:
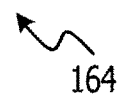
FIG. 8 depicts an example of response time period standard deviation information in a storage controlling apparatus.

The average time period calculation unit 152 and the standard deviation calculation unit 153 perform calculation of an average value or a standard deviation regarding the response time period that is I/O information for each of the individual sections classified by the data classification unit 157 (refer to FIGS. 5, 8 and so forth).

In the first classification, the data classification unit 157 confirms of a command type of a disk access request to classify whether the command type is the read command or the write command.

In the second classification, the data classification unit 157 classifies I/O information in response to the data amount of the disk access request.

The data classification unit 157 creates, based on the I/O information collected by the information collection unit 151, a frequency distribution (histogram) representative of the number of read commands for each data size and a histogram representative of the number of write commands for each data size.

The data classification unit 157 extracts two or more peak values of the number of data (data number) in each of the created histograms and determines, for each of class values (peak class values) corresponding to the extracted plurality of peak values, a midpoint between adjacent peak class values as a classification value (classification position).

The data classification unit 157 determines a classification value in the histogram for each of the read command and the write command.

Figure 4:
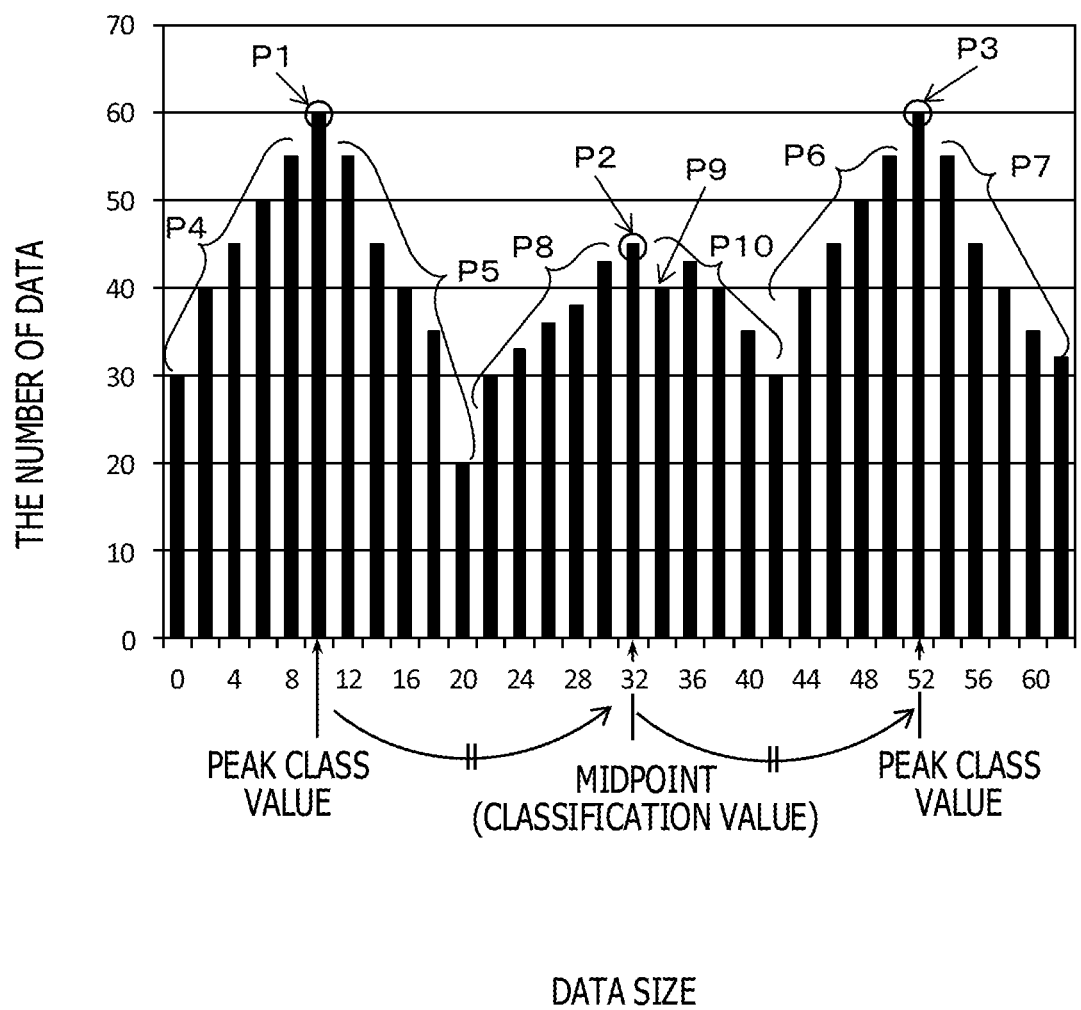
FIG. 4 depicts an example of a histogram generated by a storage controlling apparatus.

FIG. 4 depicts an example of a histogram generated by a storage controlling apparatus. It is assumed that FIG. 4 depicts a histogram regarding a plurality of read commands detected for a period of 15 minutes after first time issuance of a disk command in a disk 31 incorporated newly.

In the histogram exemplified in FIG. 4, the axis of abscissa represents the data amount when data amounts are classified in a unit of a class width determined by a technique described below, and the axis of ordinate represents the number of data aggregated for each class width.

The data classification unit 157 determines an item number and a class width of a frequency distribution in accordance with the following expression (1) and (2), respectively.

$$\text{item number of frequency distribution} = 1 + \text{squire root of total number of data} \quad (1)$$

class width of frequency distribution=(data amount MAX value−data amount MIN value)/(item number of frequency distribution) (2)

The data amount MAX value is a maximum value of the data amount of collected disk access commands, and the data amount MIN value is a minimum value of the data amount of collected disk access commands. For a class width of the frequency distribution, a value obtained by rounding off a result of the calculation of the expression (2) above in a unit of Kbyte.

The data classification unit 157 summarizes the data amounts of collected data access commands in a histogram based on the class width of a frequency distribution and extracts two or more peak values in regard to the data number.

The data classification unit 157 determines the value of any data number that protrudes in the histogram as a peak value candidate. Then, the data classification unit 157 determines, from among such peak value candidates, as a peak value, a peak value candidate where class values on both sides of the peak candidate are successive, a number of the successive class values is equal to or greater than a given number (in the present example, five) and data numbers of the successive class values decrease in order from the peak value candidate.

In the histogram of FIG. 4, three data numbers (refer to reference symbols P1, P2 and P3) corresponding to each of class values of 10 Kbytes, 32 Kbytes and 52 Kbytes in data size are peak value candidates.

For example, in regard to the peak value candidate whose data size is 10 Kbytes (refer to reference symbol P1) from among the these peak value candidates mentioned above, each of the data numbers of preceding five successive data sizes (8 Kbytes, 6 Kbytes, 4 Kbytes, 2 Kbytes and 0 Kbytes) decreases in an ascending order of the distance from 10 Kbytes with being the data size of 10 Kbytes as a maximum value (refer to reference symbol P4). Similarly, in regard to the peak value candidate whose data size is 10 Kbytes (refer to reference symbol P1), each of the data numbers of succeeding five successive data sizes (12 Kbytes, 14 Kbytes, 16 Kbytes, 18 Kbytes and 20 Kbytes) decreases in an ascending order of the distance from 10 Kbytes with being the data size of 10 Kbytes as a maximum value (refer to reference symbol P5). Accordingly, the peak value candidate whose data size is 10 Kbytes is decided as a peak value, and this data size of 10 Kbytes is determined as a peak class value.

Also the peak value candidate whose data size is 52 Kbytes is decided as a peak value similarly (refer to reference symbols P6 and P7), and the data size of 52 Kbytes is determined as a peak class value.

In regard to the peak value candidate whose data size is 32 Kbytes (refer to reference symbol P2), each of the data numbers of preceding five successive data sizes (30 Kbytes, 28 Kbytes, 26 Kbytes, 24 Kbytes and 22 Kbytes) decreases in an ascending order of the distance from 32 Kbytes with being the data size of 32 Kbytes as a maximum value (refer to reference symbol P8). However, each of the data numbers of succeeding five successive data sizes (34 Kbytes, 36 Kbytes, 38 Kbytes, 40 Kbytes and 42 Kbytes) from 32 Kbytes do not decrease in an ascending order of the distance from 32 Kbytes from a maximum value at the data size of 32 Kbytes (refer to reference symbols P9 and P10). Accordingly, the peak value candidate whose data size is 32 Kbytes does not correspond to a peak value.

Accordingly, in the histogram of FIG. 4, the data classification unit 157 acknowledges (extracts) the class value (peak value candidate) 10 Kbytes and the class value (peak value candidate) 52 Kbytes as peak class values.

The data classification unit 157 determines a midpoint between two adjacent peak class values as a classification value. In the histogram exemplified in FIG. 4, 32 Kbytes corresponding to a midpoint between the peak class value 10 Kbytes and the peak class value 52 Kbytes in data size is determined as a classification value.

The data classification unit 157 performs determination of a classification value for each of the histogram of the write command and the histogram of the read command.

The average time period calculation unit 152 calculates an average value of the response time periods in regard to the storage device 31 based on the I/O information (response time periods) collected by the information collection unit 151.

The average time period calculation unit 152 calculates an average value of the response time periods for each of the data ranges classified by the data classification unit 157 in regard to the I/O information collected by the information collection unit 151 to create response time period average value information 163.

The average time period calculation unit 152 calculates an average value of the response time periods, for example, in regard to a storage device 31 newly registered in the DE 30.

FIG. 5 depicts an example of response time period average value information in a storage controlling apparatus.

The response time period average value information 163 depicted in FIG. 5 is classified based on the classification of the I/O information exemplified in FIG. 3. For example, the response time period average value information 163 is classified, for each of a read command and a write command, into three data ranges that are (i) a range equal to or greater than 1 Mbyte, (ii) another range of 65 Kbytes to 1 Mbyte and (iii) a further range less than 65 Kbytes in response to the data amount thereby to classify the response time period average value information 163 into six data ranges. The average time period calculation unit 152 calculates an average value of response time periods for each of the data ranges.

In the response time period average value information 163 depicted in FIG. 5, the average value of the response time periods of write commands whose data amount is 1 Mbyte or more is represented by "Awl." Similarly, the average value of the response time periods of write commands whose data amount is 65 Kbytes to 1 Mbyte is represented by "Awm," and the average value of the response time periods of write commands whose data amount is less than 65 Kbytes is represented by "Aws."

The average value of the response time periods of read commands whose data amount is 1 Mbyte or more is represented by "Arl"; the average value of the response time periods of read commands whose data amount is 65 Kbytes to 1 Mbyte is represented by "Arm"; and the average value of the response time periods of read commands whose data amount is less than 65 Kbytes is represented by "Ars."

The average time period calculation unit 152 performs calculation of an average value of the response time periods and performs updating of the response time period average value information 163 every time a given period of time elapses.

Figure 6:
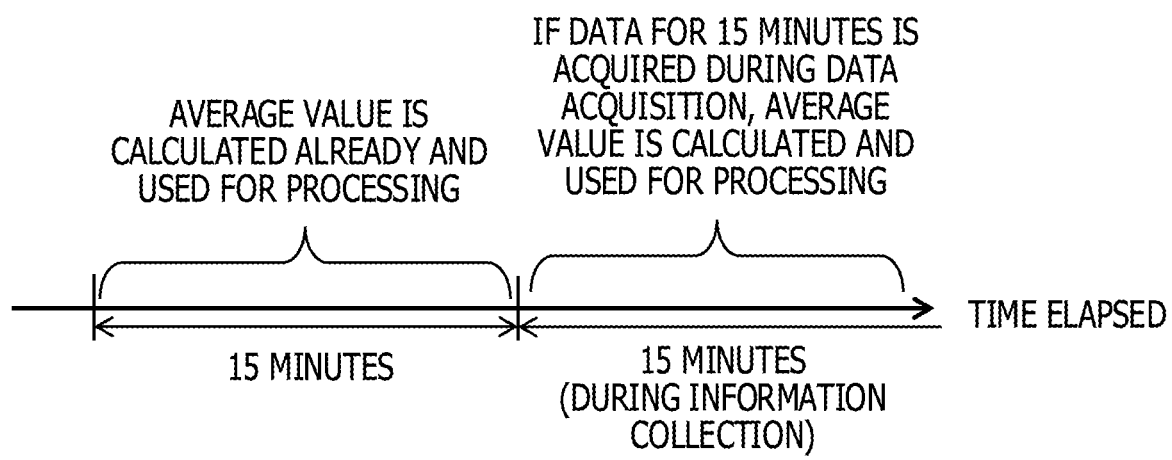
FIG. 6 depicts an example of a calculation timing of an average value of response time periods by an average time period calculation unit in a storage controlling apparatus.

FIG. 6 depicts an example of a calculation timing of an average value of response time periods by an average time period calculation unit in a storage controlling apparatus. In FIG. 6, the average time period calculation unit 152 calculates an average value of the response time periods every time a period of 15 minutes as the given period of time elapses.

If the information collection unit 151 performs collection of I/O information for 15 minutes, the average time period calculation unit 152 calculates an average value of the response time periods using the I/O information collected during the period of 15 minutes. Further, the information collection unit 151 performs collection of I/O information for a next period of 15 minutes. The average time period calculation unit 152 updates the response time period average value information 163 using the calculated average value. Since the average time period calculation unit 152 periodically updates an average value of the response time periods, it is possible to cope also with a response delay by an overload.

Figure 7:
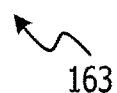
FIG. 7 depicts an example of response time period average value information in a storage controlling apparatus.

FIG. 7 depicts an example of response time period average value information in a storage controlling apparatus.

In the response time period average value information 163 exemplified in FIG. 7, 16 ms, 11 ms and 6 ms are set as an example of Awl, Awm and Aws in the response time period average value information 163 depicted in FIG. 5, respectively. Further, as an example of Arl, Arm and Ars, 14 ms, 9 ms and 5 ms are set, respectively.

An arbitrary average value from among the average values Awl, Awm, Aws, Arl, Arm and Ars of response time periods registered in the response time period average value information 163 is sometimes referred to as response average value A.

The standard deviation calculation unit 153 calculates a standard deviation of the response time period in the storage device 31 based on the I/O information (response time periods) collected by the information collection unit 151. It is to be noted that a value representative of a standard deviation may be referred to as standard deviation value.

The standard deviation calculation unit 153 calculates a standard deviation of response time periods in a storage device 31 registered newly into the DE 30.

The standard deviation calculation unit 153 calculates a standard deviation of the response time period for each of the data ranges classified by the data classification unit 157 in regard to the I/O information collected by the information collection unit 151 and creates response time period standard deviation information 164. The standard deviation calculation unit 153 creates the response time period standard deviation information 164 for each of the storage devices 31 of the DE 30.

The standard deviation calculation unit 153 calculates a standard deviation of the response time period in the storage device 31, for example, every time a storage device 31 is newly registered into the DE 30.

FIG. 8 depicts an example of response time period standard deviation information in a storage controlling apparatus.

The response time period standard deviation information 164 exemplified in FIG. 8 is classified in accordance with the classification of I/O information exemplified in FIG. 3. For example, for each of the read command and the write command, the response time period standard deviation information 164 is classified into three data ranges that are (i) a range equal to or greater than 1 Mbyte, (ii) another range of 65 Kbytes to 1 Mbyte and (iii) a further range less than 65 Kbytes in response to the data amount thereby to classify the response time period standard deviation information 164 into six data ranges. The standard deviation calculation unit 153 calculates a standard deviation of the response time period for each of the data ranges.

In the response time period standard deviation information 164 depicted in FIG. 8, the standard deviation of the response time period of write commands whose data amount is equal to or greater than 1 Mbyte is represented by "Swl." Similarly, the standard deviation of the response time period of write commands whose data amount is 65 Kbytes to 1 Mbyte is represented by "Swm," and the standard deviation of the response time period of write commands whose data amount is less than 65 Kbytes is represented by "Sws."

The standard deviation of the response time period of read commands whose data amount is equal to or greater than 1 Mbyte is represented by "Srl"; the standard deviation of the response time period of read commands whose data amount is 65 Kbytes to 1 Mbyte is represented by "Srm"; and the standard deviation of the response time period of read commands whose data amount is less than 65 Kbytes is represented by "Srs."

The standard deviation calculation unit 153 performs calculation of a standard deviation of the response time period and updating of the response time period standard deviation information 164 for each given period (for example, one month).

Different from the average time period calculation unit 152, the standard deviation calculation unit 153 does not carry out value updating after every 15 minutes. This is because it is intended to suppress a situation that I/O in regard to which a response is delayed by a slowdown is included in the target of calculation of the standard deviation.

For example, if the value of a standard deviation is not updated, a response delay by time-dependent degradation of the disk 31 is not sufficiently reflected on the calculation of a standard deviation and it is considered that the probability that a slowdown may be detected in error increases as time passes.

Therefore, in the present controlling apparatus, the standard deviation calculation unit 153 decides a degradation tendency of the disk 31 from a variation in average value of the response time periods and changes the value of the response time period standard deviation information 164 after every given period of time (for example, one month).

Figure 9:
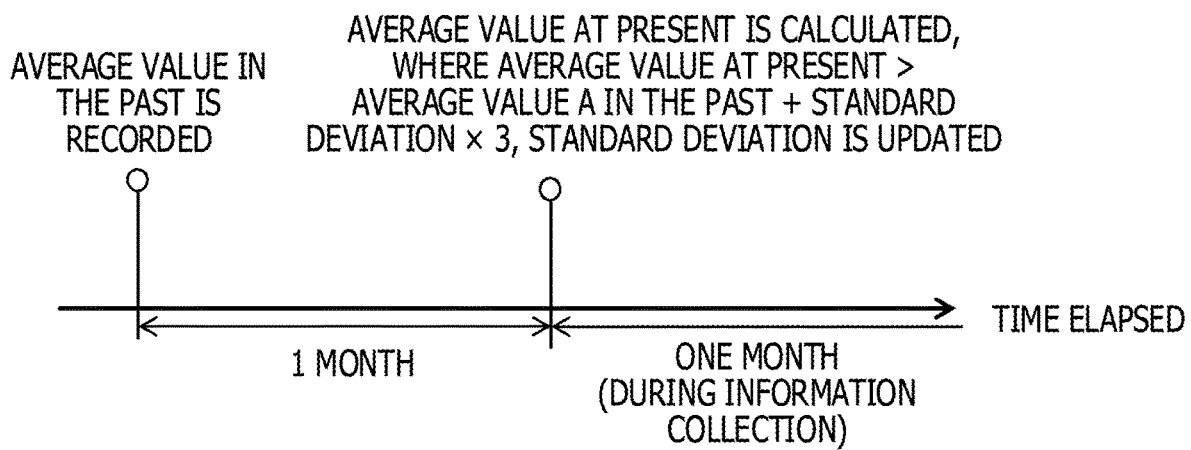
FIG. 9 depicts an example of a calculation timing of a standard deviation of response time period by a standard deviation calculation unit in a storage controlling apparatus.

FIG. 9 depicts an example of a calculation timing of a standard deviation of response time period by a standard deviation calculation unit in a storage controlling apparatus.

As depicted in FIG. 9, when a conditional expression (3) given below is satisfied based on an average value or values of the response time period calculated in the past, the latest (current) average value of the response time periods calculated by the average time period calculation unit 152 and the calculated standard deviation, the standard deviation calculation unit 153 rewrites the response time period standard deviation information 164 using the latest value of the standard deviation.

$$\text{current average value} > \text{average value } A \text{ in the past} + \text{standard deviation } S \times 3 \qquad (3)$$

Here, the addition of the value of three times the standard deviation S to the average value A in the past is based on the fact that, in a normal distribution, 99.7% of data are statistically included in a range three times the standard deviation centered at an average value. For example, the satisfaction of the above described expression (3) indicates that the current response time period has varied by a great amount in comparison with that at a point of time at which an average value was calculated in the past.

Figure 10A:
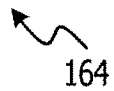
FIGS. 10A and 10B depict examples of response time period standard deviation information in a storage controlling apparatus.
Figure 10B:
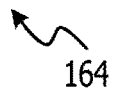

FIGS. 10A and 10B depict examples of response time period standard deviation information in a storage controlling apparatus. FIGS. 10A and 10B depict the response time period standard deviation information 164 in regard to disks 31 different from each other.

In the response time period standard deviation information 164 depicted in FIG. 10A, 1.0, 1.54 and 1.59 are set as an example of Swl, Swm and Sws in the response time period standard deviation information 164 depicted in FIG. 8, respectively. Further, 1.86, 1.42 and 1.60 are set as an example of Srl, Srm and Srs, respectively.

In the response time period standard deviation information 164 depicted in FIG. 10B, 1.14, 1.64 and 1.50 are set as an example of Swl, Swm and Sws in the response time period standard deviation information 164 depicted in FIG. 8, respectively. Further, 1.79, 1.70 and 1.65 are set as an example of Srl, Srm and Srs, respectively.

The decision unit 154 decides whether or not a disk (first storage device) 31 is in a slowdown state based on a response time period (response achievement time period) R to a disk access (first data access request) to the disk 31, which occurs in accordance with an I/O request issued newly from the host apparatus 2. The decision unit 154 decides whether the disk (first storage device) 31 of the decision target is in the slowdown state by performing decisions 1 to 3 given below. In the following description, the response time period R to a disk access to the disk 31, which occurs in accordance with an I/O request issued newly from the host apparatus 2, is sometimes referred to merely as response time period R. This response time period R indicates a response situation regarding data access to the disk 31.

The decision unit 154 compares (first comparison) the response time period R with an average value A of response time periods within a data range corresponding to a data amount of a disk access in the response time period average value information 163 regarding the same disk 31. Consequently, the decision unit 154 evaluates a delay situation of the response.

For example, if the disk access by a new I/O request is a read command of a data size of 1 Mbyte or more, the decision unit 154 compares the response time period R to this read command with the response time period average value Arl (for example, refer to FIG. 7) in the response time period average value information 163.

If the result of the comparison indicates that the response time period R is equal to or shorter than the response time period average value A (R≤A), this indicates that a delay of the response has not occurred, and the decision unit 154 decides that the disk 31 is not in the slowdown state.

If the result of the comparison indicates that the response time period R is longer than the response time period average value A (R>A), this indicates that a delay of the response has occurred, and the decision unit 154 decides that the disk 31 may suffer from a slowdown and performs a decision 2 given below.

For example, the decision unit 154 evaluates the delay situation of the response by comparing (supervising) the response time period R in the disk 31 with the response time period average value A.

The decision unit 154 compares (second comparison) the response time period R with the "response time period average value A+3×standard deviation S" of the same disk 31. The response time period average value A indicates an average value A of the response time periods in the data range corresponding to the data amount of the disk access in the response time period average value information 163 regarding the same disk 31.

For example, this average value A corresponds to a response time period average value calculated based on a plurality of response achievement time periods to a plurality of data access requests performed in prior to a first data access request to the disk (first storage device) 31 of the decision target.

The standard deviation S indicates a standard deviation S of the response time period of the data range corresponding to the data amount of the disk access in the response time period standard deviation information 164 regarding the same disk 31.

For example, the standard deviation S corresponds to a response time period standard deviation calculated based on a plurality of response achievement time periods to a plurality of data access requests performed in prior to the first data access request to the disk (first storage device) 31 of the decision target.

For example, if the disk access by the new I/O request is a read command of a data size of 1 Mbyte or more, the decision unit 154 acquires the response time period average value Arl (refer, for example, to FIG. 7) in the response time period average value information 163 and the standard deviation Srl (for example, refer to FIG. 10) in the response time period standard deviation information 164.

The decision unit 154 compares the response time period R with the "response time period average value Arl+3× standard deviation Srl." In the following description, a calculated value of the "response time period average value A+3×standard deviation S" of the same disk 31 is represented by reference symbol α. The decision unit 154 compares the response time period R with the calculated value α.

If the result of the comparison indicates that the response time period R is equal to or shorter than the calculated value α (R≤α), the decision unit 154 decides that the disk 31 is not in the slowdown state.

If the result of the comparison indicates that the response time period R is longer than the calculated value α (R>α), the decision unit 154 decides that the disk 31 may suffer from a slowdown and makes a decision 3 given below.

For example, the decision unit 154 evaluates the delay situation of a response by comparing (supervising) the response time period R in the disk 31 with the response time period average value A.

The decision unit 154 compares (third comparison) the response time period R with the "response time period average value A+3×standard deviation S" of another disk (member disk) 31 configuring the same RAID (RAID group). The response time period average value A indicates an average value A of the response time period of a data range corresponding to the data amount of the disk access in the response time period average value information 163 regarding the another disk 31 configuring the same RAID. The standard deviation S indicates a standard deviation S of the response time period of the data range corresponding to the data amount of the disk access in the response time period standard deviation information 164 regarding the another disk 31 configuring the same RAID.

For example, if the disk access by the new I/O request is a read command of a data size of 1 Mbyte or more, the decision unit 154 acquires the response time period average value Arl (for example, refer to FIG. 7) in the response time period average value information 163 and the standard deviation Srl (for example, refer to FIG. 10) in the response time period standard deviation information 164 regarding the another disk 31 configuring the same RAID.

The decision unit 154 compares the response time period R with the "response time period average value Arl+3×standard deviation Srl" regarding each another disk 31 of the same RAID. In the following description, a calculated value of the "response time period average value A+3×standard deviation S" of another disk 31 of the same RAID is indicated by reference symbol β. The decision unit 154 compares the response time period R with the calculated value β of each disk 31.

If the result of the comparison indicates that, for example, the response time period R is equal to or shorter than the calculated values β (R≤β) of all disks 31, the decision unit 154 decides that the disks 31 do not suffer from a slowdown.

If the result of the comparison indicates that the response time period R is longer than the calculated value β of some disk 31 (R>β), the decision unit 154 decides that the disk 31 is in the slowdown state. In the following description, a disk 31 decided to suffer from a slowdown is sometimes referred to as a slowdown disk 31.

The decision result by the decision unit 154 is conveyed to the saving processor 155 and the warning processor 156.

The saving processor 155 saves data of the slowdown disk 31 into a hot spare disk. Further, the saving processor 155 performs, after the saving processor 155 saves the data of the slowdown disk 31 into the hot spare disk, detachment (degeneracy) of the slowdown disk 31.

If the decision unit 154 decides that the disk 31 is in the slowdown state, the saving processor 155 counts up (increments) the value (count value) of a slowdown counter corresponding to the slowdown disk 31. The slowdown counter counts the number of times of detection of slowdown and is provided for each disk 31.

If the count value of the slowdown counter exceeds a given threshold value (detachment threshold value), the saving processor 155 saves data of the slowdown disk 31 into a hot spare disk and then detaches the slowdown disk 31. The detachment of the slowdown disk 31 is performed using a self-monitoring, analysis and reporting technology (SMART) function.

If the count value of the slowdown counter does not exceed the detachment threshold value but exceeds a warning threshold value, the saving processor 155 causes the warning processor 156 to output a warning. It is to be noted that the warning threshold value is a value smaller than the detachment threshold value. The warning processor 156 outputs a warning to a system manager or an operator and notifies the system manager or operator that the disk (slowdown disk) 31 is in the slowdown state and there is the possibility that detachment may be performed. The saving processor 155 records that the warning threshold value is exceeded into an analysis log.

If the count value of the slowdown counter does not exceed any of the detachment threshold value and the warning threshold value, the saving processor 155 does not perform saving of data into a hot spare disk or detachment of the slowdown disk 31.

The warning processor 156 outputs a warning to an operator, a system manager or the like. If the counter value of the slowdown counter exceeds the warning threshold value, the warning processor 156 issues a notification that the disk (slowdown disk) 31 is in the slowdown state and there is the possibility that detachment may be performed by the saving processor 155. For example, the warning processor 156 causes, for example, a display unit of the management terminal 3 to output a message or the like that the disk (slowdown disk) 31 is in the slowdown state and there is the possibility that the detachment may be performed. The warning processor 156 causes the display unit of the management terminal 3 to output a message or the like that the slowdown has occurred with the disk (slowdown disk) 31 and the detachment has been performed. Further, the warning processor 156 may use, as the notification method to an operator, a system manager or the like, various known techniques.

In the storage controlling apparatus 100, if, for example, a write request (I/O request) is issued from the host apparatus 2 to a volume, the disk access controller 158 issues a disk access command to the corresponding disk 31 in accordance with the write request.

The information collection unit 151 performs accumulation of I/O information for each disk 31 in regard to disk access commands for each of read and write.

Figure 11:
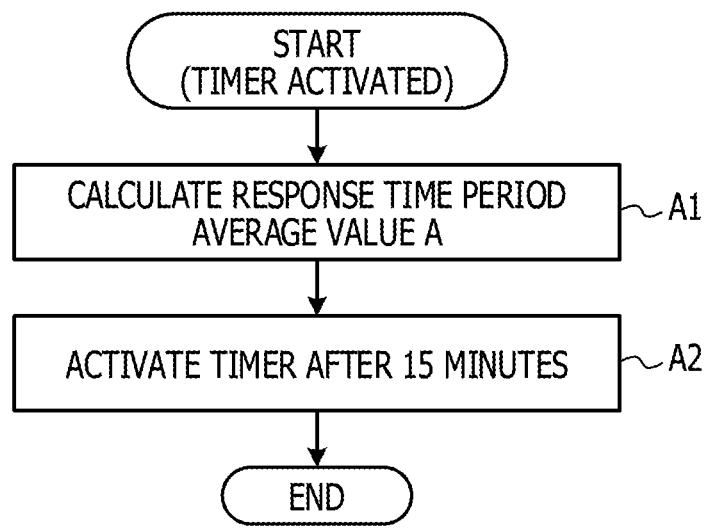
FIG. 11 depicts an example of a calculation method of an average value of response time periods by an average time period calculation unit in a storage controlling apparatus.

FIG. 11 depicts an example of a calculation method of an average value of response time periods by an average time period calculation unit in a storage controlling apparatus.

The processing described below is started at a timing at which, for example, it is detected by a timer that a given period of time (for example, 15 minutes) elapses.

In operation A1, the average time period calculation unit 152 calculates an average value A of response time periods included in each of data ranges classified by the data classification unit 157.

Thereafter, in operation A2, the average time period calculation unit 152 activates a timer for measuring a given period of time (for example, 15 minutes) and then ends the processing.

Figure 12:
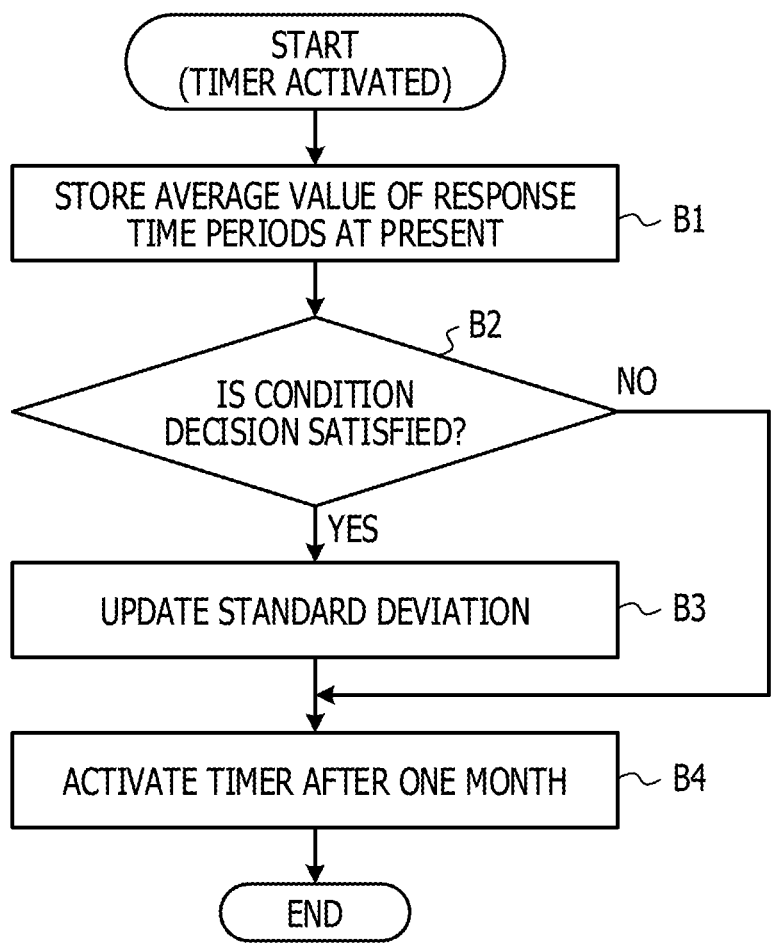
FIG. 12 depicts an example of a calculation method of a standard deviation of a response time period by a standard deviation calculation unit in a storage controlling apparatus.

FIG. 12 depicts an example of a calculation method of a standard deviation of a response time period by a standard deviation calculation unit in a storage controlling apparatus.

The following processing is started at a timing at which it is detected, for example, by the timer that the given period of time (for example, one month) elapses.

After the average time period calculation unit 152 calculates an average value of the response time periods, the latest average value is stored into the response time period average value information 163 in operation B1.

In operation B2, the standard deviation calculation unit 153 confirms whether the conditional expression (3) given hereinabove is satisfied based on an average value of the response time periods calculated in the past, the latest (current) average value of the response time periods calculated by the average time period calculation unit 152 and the calculated standard deviation.

If the result of the confirmation indicates that the conditional expression (3) is not satisfied (refer to the NO route of operation B2), the processing advances to operation B4.

If the conditional expression (3) is satisfied (refer to the YES route of operation B2), the processing advances to operation B3. In operation B3, the standard deviation calculation unit 153 updates the response time period standard deviation information 164 using the standard deviation calculated newly.

In operation B4, the standard deviation calculation unit 153 sets the timer such that an updating process of the response time period standard deviation information 164 is started one month later and then ends the processing.

Figure 13:
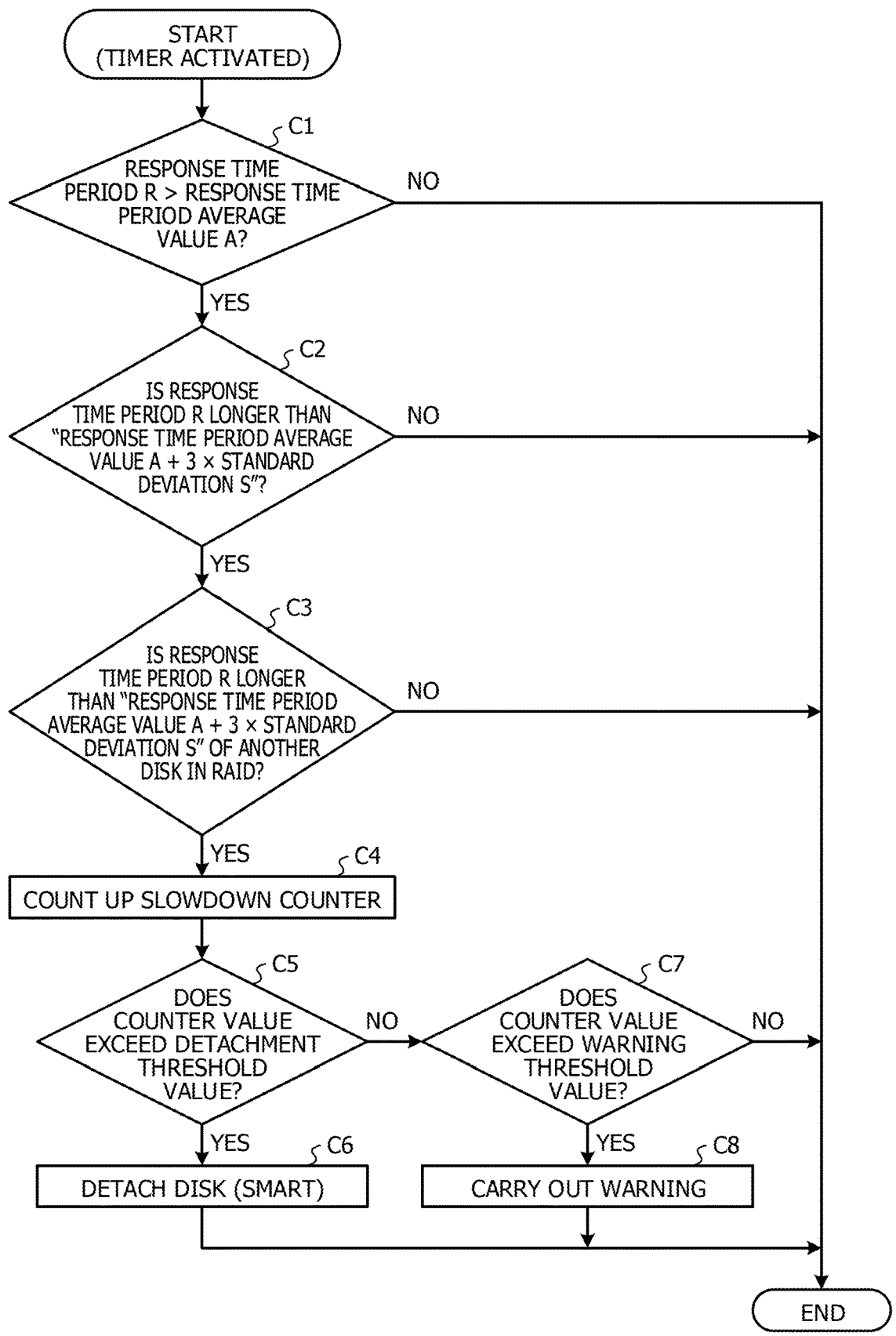
FIG. 13 depicts an example of a detaching process of a disk in a storage controlling apparatus.

FIG. 13 depicts an example of a detaching process of a disk in a storage controlling apparatus.

In operation C1, the decision unit 154 confirms in regard to a disk (first storage device) 31 of a decision target whether the response time period R is longer than the average value A of the response time periods of a data range corresponding to a data amount of a disk access in the response time period average value information 163 regarding the same disk 31.

If the result of the confirmation indicates that the response time period R is equal to or shorter than the average value A of the response time periods (refer to the NO route of operation C1), the processing is ended.

If the result of the confirmation indicates that the response time period R is longer than the average value A of the response time periods (refer to the YES route of operation C1), the processing advances to operation C2.

In operation C2, the decision unit 154 confirms whether the response time period R is longer than the "average value A of the response time periods+3×standard deviation S" of the same disk 31.

If the result of the confirmation indicates that the response time period R is equal to or shorter than the "the average value A of the response time periods+3×standard deviation S" of the same disk 31 (refer to the NO route of operation C2), the processing is ended.

If the result of the confirmation indicates that the response time period R is longer than the "response time period average value A+3×standard deviation S" of the same disk 31 (refer to the YES route of operation C2), the processing advances to operation C3.

In operation C3, the decision unit 154 confirms whether the response time period R is longer than the "the average value A of the response time periods+3×standard deviation S" of another disk 31 configuring the same RAID.

If the result of the confirmation indicates that the response time period R is equal to or shorter than the "the average value A of the response time periods+3×standard deviation S" of another disk 31 configuring the same RAID (refer to the NO route of operation C3), the processing is ended.

If the result of the confirmation indicates that the response time period R is longer than the "the average value A of the response time periods+3×standard deviation S" of another disk 31 configuring the same RAID (refer to the YES route of operation C3), the processing advances to operation C4.

In operation C4, the saving processor 155 counts up the value (count value) of the slowdown counter corresponding to the slowdown disk 31.

In operation C5, the saving processor 155 confirms whether the count value of the slowdown counter exceeds the detachment threshold value. If the count value exceeds the detachment threshold value (refer to the YES route of operation C5), the processing advances to operation C6.

In operation C6, the saving processor 155 saves data of the slowdown disk 31 into the hot spare disk, whereafter the saving processor 155 detaches the slowdown disk 31 by the SMART function. Thereafter, the processing is ended.

If the result of the confirmation in operation C5 indicates that the count value does not exceed the detachment threshold value (refer to the NO route of operation C5), the processing advances to operation C7.

In operation C7, the saving processor 155 confirms whether the count value of the slowdown counter exceeds the warning threshold value. If the count value exceeds the warning threshold value (refer to the YES route of operation C7), the processing advances to operation C8.

In operation C8, the saving processor 155 causes the warning processor 156 to output a warning. Thereafter, the processing is ended. If the result of the confirmation in operation C7 indicates that the count value does not exceed the warning threshold value (refer to the NO route of operation C7), the processing is ended.

According to the storage controlling apparatus 100, the decision unit 154 compares the response time period R to a data access request to a disk 31 with the average value A of the response time periods of a data range corresponding to the data amount of the disk access in the response time period average value information 163 regarding the same disk 31.

If the result of the comparison indicates that the response time period R is longer than the average value A of the response time periods (R>A), this indicates that a delay of the response has occurred, and it may be decided that there is the possibility that the disk 31 may suffer from a slowdown.

Further, if the decision unit 154 decides that there is the possibility that the disk 31 may suffer from a slowdown in this manner, the decision unit 154 compares (second comparison) the response time period R with the "average value A of the response time periods+3×standard deviation S" (=calculated value $\alpha$) of the same disk 31.

If the result of the comparison indicates that the response time period R is longer than the calculated value $\alpha$ (R>$\alpha$), it may be decided that there is the possibility that the disk 31 may suffer from a slowdown.

If it is decided that there is the possibility that the disk 31 may suffer from a slowdown, the decision unit 154 further compares the response time period R with the "the average value A of the response time periods+3×standard deviation S" (=calculated value $\beta$) of another disk 31 configuring a RAID same as that of the target disk 31.

If the result of the comparison indicates that the response time period R is longer than the calculated value $\beta$ (R>$\beta$), the decision unit 154 decides that the disk 31 is in the slowdown state.

If an average value A of the response time periods or a standard deviation S of the response time period of another disk 31 in the same RAID is used in decision, it may be decided whether the cause of a response delay of the disk 31 arises from an overload or from a slowdown. Consequently, a disk 31 in which a slowdown occurs may be detached certainly at an early stage and the performance of the RAID group may be maintained.

The data classification unit 157 classifies I/O information into command types and provides a data range for each of the command types. Consequently, a detection error of a command delay depending upon a difference in data amount or command type may be suppressed. Further, even with a command of a small data amount, the slowdown may be detected with certainty.

Since the standard deviation calculation unit 153 periodically updates the standard deviation of the delay decision of I/O, a slowdown may be detected with a response delay, which arises from time-dependent degradation of the disk 31, taken into consideration.

Since the information collection unit 151 collects I/O information and records the I/O information into the log information storage region 162, an event of a delay or a temporary response delay remains in a log and may be utilized for resolution of the delay problem.

For example, although the storage apparatus 1 depicted in FIG. 1 includes the two CMs 100a and 100b, the storage apparatus 1 is not limited to two and may include one or three or more CMs 100.

All examples and conditional language recited herein are intended for pedagogical purposes to and the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage controlling apparatus, comprising:
an interface configured to be coupled to a plurality of storage devices in a first storage group;
a memory; and
a processor coupled to the memory and the interface, the processor configured to:
collect, in each of a first period of time, for each of the plurality of storage devices, log information including a plurality of first response time periods for data accesses each from a first time point to a second time point, the first time point being a time point when a first data access request is issued to an associated storage device from among the plurality of storage devices, the second time point being a time point when a response against the first data access request is received from the associated storage device;
calculate, in each of the first period of time, an average time period of the plurality of first response time periods;
obtain, in each of a second period of time, a latest average time period and a past average time period which is calculated before the second period time from among calculated average time periods;
determine whether a conditional expression based on the latest average time period, the past average time period and a standard deviation is satisfied;
calculate, when determining that the conditional expression is satisfied, a new standard deviation based on a plurality of second response time periods which are collected in the latest second period time;
use, when determining that the conditional expression is not satisfied, the standard deviation as the new standard deviation;
obtain a response time period based on an access request for one of the plurality of storage devices;
determine whether the response time period is longer than the past average time period;
determine, when the response time period is longer than the past average tome period, whether the response time period is longer than a first value obtained by adding the past average time period and three time the new standard deviation;
determine, when the response time period is longer than the first value, whether the response time period is longer than a second value obtained by adding the past average time period of a second storage group different from the first storage group and three time the new standard deviation of the second storage group;
determine performance degradation of the one of the plurality of storage devices when the response time period is longer than the second value;
count up a count value of a counter when the response time period is longer than the second value; and
detach the one of the plurality of storage devices from the first storage group after saving data of the one of the plurality of storage devices into a spare disk,
the first storage group and the second data group are a redundant array of inexpensive disks,
the conditional expression is that the latest average time period is longer than a value obtained by adding the past average time period and three times the standard deviation.

2. A non-transitory computer-readable recording medium recording a storage controlling program causing a computer to perform a processing, the computer comprising an interface configured to be coupled to a plurality of storage devices in a first storage group and a processor coupled to the interface, the processing comprising:
collecting, in each of a first period of time, for each of the plurality of storage devices, log information including a plurality of first response time periods for data accesses each from a first time point to a second time point, the first time point being a time point when a first data access request is issued to an associated storage device from among the plurality of storage devices, the second time point being a time point when a response against the first data access request is received from the associated storage device;
calculating, in each of the first period of time, an average time period of the plurality of first response time periods;
obtaining, in each of a second period of time, a latest average time period and a past average time period which is calculated before the second period time from among calculated average time periods;
determining whether a conditional expression based on the latest average time period, the past average time period and a standard deviation is satisfied;
calculating, when determining that the conditional expression is satisfied, a new standard deviation based on a plurality of second response time periods which are collected in the latest second period time;
using, when determining that the conditional expression is not satisfied, the standard deviation as the new standard deviation;
obtaining a response time period based on an access request for one of the plurality of storage devices;
determining whether the response time period is longer than the past average time period;
determining, when the response time period is longer than the past average tome period, whether the response time period is longer than a first value obtained by adding the past average time period and three time the new standard deviation;
determining, when the response time period is longer than the first value, whether the response time period is longer than a second value obtained by adding the past average time period of a second storage group different from the first storage group and three time the new standard deviation of the second storage group;
determining performance degradation of the one of the plurality of storage devices when the response time period is longer than the second value;
counting up a count value of a counter when the response time period is longer than the second value; and
detaching the one of the plurality of storage devices from the first storage group after saving data of the one of the plurality of storage devices into a spare disk,
the first storage group and the second data group are a redundant array of inexpensive disks,
the conditional expression is that the latest average time period is longer than a value obtained by adding the past average time period and three times the standard deviation.

3. A storage controlling method performed by a computer, the computer including an interface configured to be coupled to a plurality of storage devices in a first storage group and a processor coupled to the interface, the method comprising:

collecting, in each of a first period of time, for each of the plurality of storage devices, log information including a plurality of first response time periods for data accesses each from a first time point to a second time point, the first time point being a time point when a first data access request is issued to an associated storage device from among the plurality of storage devices, the second time point being a time point when a response against the first data access request is received from the associated storage device;

calculating, in each of the first period of time, an average time period of the plurality of first response time periods;

obtaining, in each of a second period of time, a latest average time period and a past average time period which is calculated before the second period time from among calculated average time periods;

determining whether a conditional expression based on the latest average time period, the past average time period and a standard deviation is satisfied;

calculating, when determining that the conditional expression is satisfied, a new standard deviation based on a plurality of second response time periods which are collected in the latest second period time;

using, when determining that the conditional expression is not satisfied, the standard deviation as the new standard deviation;

obtaining a response time period based on an access request for one of the plurality of storage devices;

determining whether the response time period is longer than the past average time period;

determining, when the response time period is longer than the past average tome period, whether the response time period is longer than a first value obtained by adding the past average time period and three time the new standard deviation;

determining, when the response time period is longer than the first value, whether the response time period is longer than a second value obtained by adding the past average time period of a second storage group different from the first storage group and three time the new standard deviation of the second storage group;

determining performance degradation of the one of the plurality of storage devices when the response time period is longer than the second value;

count up a count value of a counter when the response time period is longer than the second value; and detach the one of the plurality of storage devices from the first storage group after saving data of the one of the plurality of storage devices into a spare disk, the first storage group and the second data group are a redundant array of inexpensive disks, the conditional expression is that the latest average time period is longer than a value obtained by adding the past average time period and three times the standard deviation.

* * * * *